United States Patent [19]

Otani et al.

[11] Patent Number: 4,982,970
[45] Date of Patent: Jan. 8, 1991

[54] CLAW UNIT WITH PAIRED SEPARABLY CONNECTED CLAW ELEMENTS

[75] Inventors: Atsushi Otani, Abiko; Hidefumi Shirotori, Abikoshi; Nobuyuki Morikawa, Nara; Shunsuke Otani, Kasiwara, all of Japan

[73] Assignee: Hitachi Seiki Co., Ltd., Abiko, Japan

[21] Appl. No.: 218,856

[22] Filed: Jul. 14, 1988

[30] Foreign Application Priority Data

Aug. 19, 1987 [JP] Japan .................. 62-126142[U]

[51] Int. Cl.$^5$ ............................................ B23B 31/16
[52] U.S. Cl. ...................................... 279/123; 279/121
[58] Field of Search ................. 279/123, 15 J, 89, 93, 279/94, 121, 110; 403/381, 324, 353

[56] References Cited

U.S. PATENT DOCUMENTS

| | | |
|---|---|---|
| 167,165 | 8/1875 | Grant . |
| 3,744,125 | 7/1973 | Schalles .................. 29/568 |
| 3,945,654 | 3/1976 | McMullen ................. 279/123 |
| 4,029,325 | 6/1977 | Piöhm .................... 279/123 |
| 4,587,708 | 5/1986 | Miyachi ................... 29/568 |
| 4,639,001 | 1/1987 | Berardo .................. 279/121 |
| 4,667,971 | 5/1987 | Norton et al. ............ 279/121 |
| 4,667,972 | 5/1987 | Hiestand ................. 279/123 |
| 4,725,065 | 2/1989 | Hiestand .............. 279/15 J X |
| 4,763,906 | 8/1988 | Barbieux ................. 279/123 |

FOREIGN PATENT DOCUMENTS

| | | |
|---|---|---|
| 150313 | 8/1985 | Fed. Rep. of Germany . |
| 3434308 | 3/1986 | Fed. Rep. of Germany ...... 279/123 |
| 10405 | 1/1983 | Japan .................... 279/123 |
| 60-201806 | 3/1984 | Japan . |
| 60-99505 | 6/1985 | Japan . |
| 61-279403 | 12/1986 | Japan . |

Primary Examiner—Z. R. Bilinsky
Assistant Examiner—Robert Schultz
Attorney, Agent, or Firm—Cushman, Darby & Cushman

[57] ABSTRACT

Disclosed is a claw unit with paired separably connected claw elements, which comprises a chuck body, a master jaw, a top jaw, position-limiting members, a locking member, and an engaging member. When the engaging member is rotated, the locking member which is in engagement with the engaging member is retreated into the master jaw from a front surface thereof. Thereafter, the top jaw is forced into the front surface of the master jaw. When the top jaw has been thus brought into engagement with the position-limiting members and further into contact with the front surface of the master jaw, the top jaw is moved somewhat in a radial direction of the chuck body. When, in this state, the engaging member is rotated, the locking member which has been elastically urged is allowed to rush into a positioning hole of the top jaw to lock the top jaw. Thus, the top jaw is made integral with the master jaw. When it is desired to demound the top jaw from the master jaw, the engaging member is rotated so as to permit the locking member to be retreated into the master jaw.

1 Claim, 3 Drawing Sheets

CLAW UNIT WITH PAIRED SEPARABLY CONNECTED CLAW ELEMENTS

BACKGROUND OF THE INVENTION

1. Field of the Invention

The present invention relates to a claw unit with paired separably connected claw elements, which is used for NC lathe or the like and, more particularly, to a claw unit with such paired claw elements, master jaw and top jaw, which permits the top jaw to be mounted on the master jaw, or separated therefrom for replacement in a simple manner.

2. Description of the Prior Art

Japanese Patent Unexamined Publication Nos. 60-201806 and 61-279403 disclose a claw unit with a pair of separably connected claw elements, master jaw and top jaw, which permits the top jaw to be mounted or demounted for replacement by way of a one-touch operation. In this claw unit, the master jaw is mounted, as disclosed in said literatures, with a clamp pin device which is equipped interiorly with a positioning pin so that the latter may protrude from, or retreat into, the clamp pin device. On the other hand, the top jaw is formed therein with an eccentric hole into which the clamp pin device is to be inserted, the eccentric hole being formed at a portion thereof with a groove. Whereby, a chuck involved is moved after insertion of the clamp pin device into the eccentric hole of the top jaw, to cause a flange portion of the clamp pin device to be fitted into the groove of the eccentric hole, thereby locking the top jaw to the master jaw.

According to the above-described conventional claw unit, however, it is not easy to effect aligning of the protruded portion of the master jaw with respect to the eccentric hole of the top jaw. This requires the machining of each element with high accuracy. According to the extent of accuracy to which each element is machined, it is impossible to effect a reliable aligning between the master jaw and the top jaw. This often results in locking and supporting of the top jaw by the clamp pin device only. This makes unstable the state wherein the top jaw is locked and supported. Further, when the top jaw is misaligned, or according to the manner in which some unbalanced forces are applied, it is possible that the top jaw is locked at some other position than its proper position, and thus becomes inseparable.

SUMMARY OF THE INVENTION

The present invention has been made under the above-described existing circumstances and it is an object of the present invention to provide a claw unit with paired separably connected claw elements which permits the top jaw to be mounted on and demounted from the master jaw by way of simple arrangements and without being misaligned with respect to the master jaw; which is capable of preventing the entry of any chip onto a locking member; and which permits a reliable aligning and contacting between respective confronting surface of the master jaw and the top jaw because such confronting surfaces are constituted by linear surfaces, while, on the other hand, permitting the locked state of the top jaw to be released, by way of a simple structure, from the radial direction of a chuck body on which the master jaw is mounted, i.e., which permits both jaws to be engaged with each other not only with reliability but also with stability, whiel, on the other hand, permitting both jaws as engaged to be readily disengaged from each other.

To attain the above object, according to the present invention, there is provided a claw unit with paired separably connected claw elements, which comprises a chuck body being mounted on a rotatable main shaft of a machine tool, a master jaw constituting one of the paired claw elements and mounted on the chuck body so that the master jaw may be movable in a radial direction of the chuck body, the master jaw having engaging portions on its front surface which are linearly formed in a direction intersecting the radial direction at right angles thereto, a top jaw constituting the other of the paired claw elements and mounted on the master jaw by being engaged with the engaging portions thereof by being moved in the radial direction, position-limiting members provided on one of the master jaw and the top jaw for limiting the position of the top jaw relative to the master jaw, a locking member provided in the master jaw so that when a specified position of the top jaw relative to the master jaw has been determined, the locking member may be moved in an axial direction of the rotatable main shaft by the urging force of an elastic member so as to lock the top jaw, and an engaging member provided in the master jaw so that the engaging member may be engaged with the locking member so as to cause the locking member to advance and retreat and thereby lock the top jaw to, and unlock the top jaw from the master jaw.

When the top jaw is mounted on the master jaw, the engaging member is rotated by, for example, a driver so as to cause the locking member, which is in engagement with the engaging member, to be retreated into the master jaw from a front surface thereof. Thereafter, a specified top jaw is forced into the front surface of the master jaw.

When the top jaw has been thus brought into engagement with the position-limiting members provided on the front surface of the master jaw and further into contact with the front surface of the master jaw, the top jaw is moved somewhat in a radial direction of the chuck body. When, thereafter, the engaging member is rotated, the locking member which has been urged by a spring is allowed to rush into a positioning hole of the top jaw to lock the same. Thus, the top jaw is made integral with the master jaw. When the top jaw is demounted from the master jaw, the engaging member has only to be rotated so as to cause the locking member to be retreated into the master jaw.

DESCRIPTION OF THE PREFERRED EMBODIMENT

An embodiment of the present invention will now be described with reference to the drawings.

Figure 1:
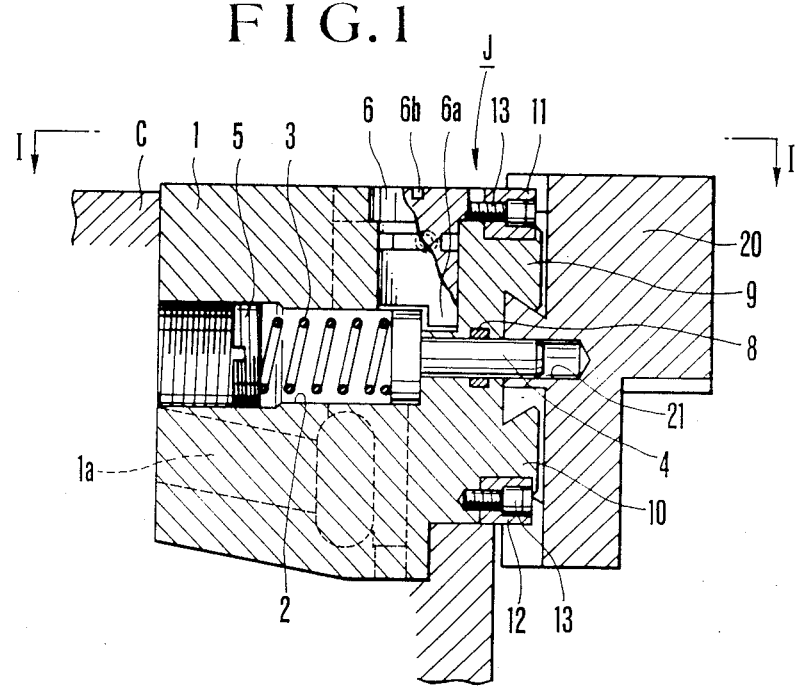
FIG. 1 is a longitudinal sectional view of a claw unit with paired separably connected claw elements according to the invention.
Figure 2:
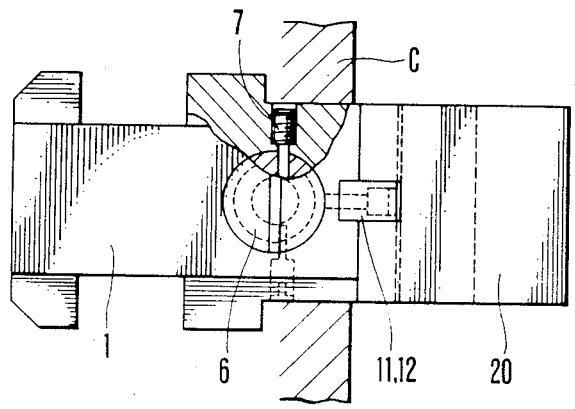
FIG. 2 is a view taken along the line I—I of FIG. 1.
Figure 3:
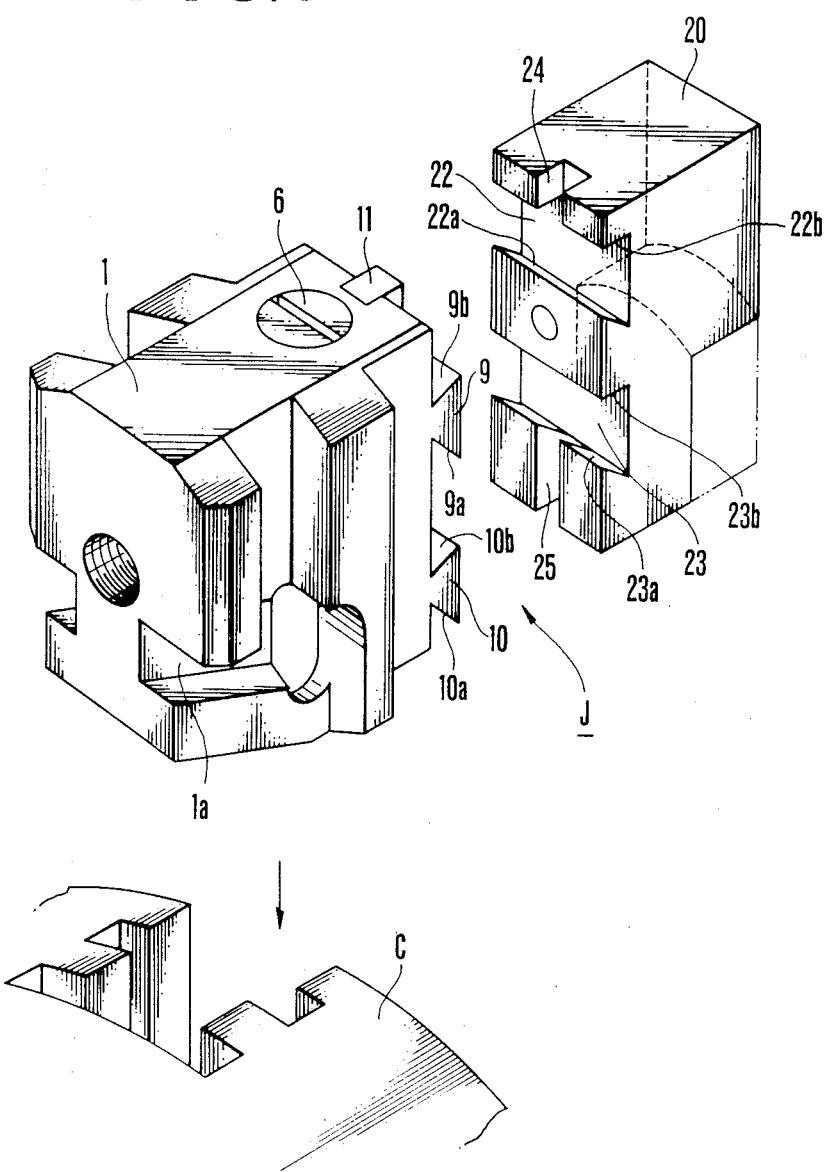
FIG. 3 is an exploded perspective view of the claw unit with paired separably connected claw elements as a whole.
Figure 4:
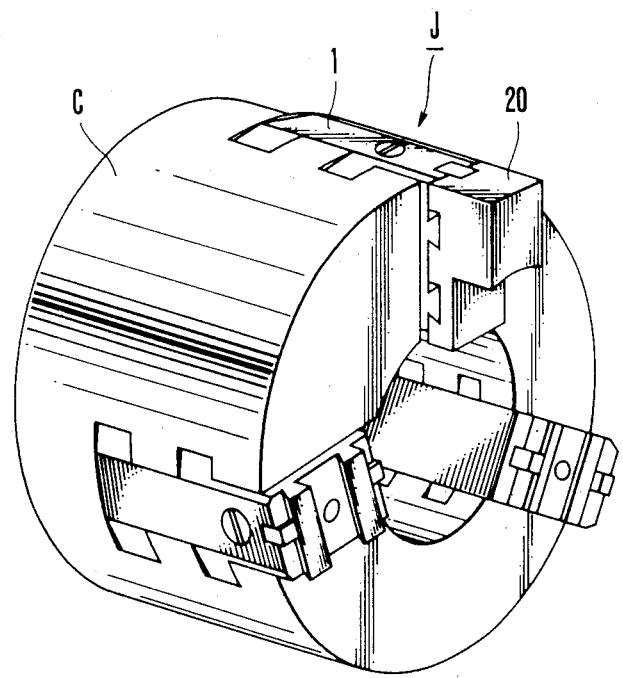
FIG. 4 is a perspective view of the claw unit with paired separably connected claw elements which is incorporated in a chuck body.

A claw unit with paired separably connected claw elements, which includes a chuck body, as a whole will first be described with reference to FIGS. 1 to 4.

A chuck body C which is rotatably connected to a main shaft (not shown) of a lathe in the interior thereof is formed with a groove in its radial direction, into which a master jaw 1 is fitted. Wedge grooves 1a are formed in those sideward portions of the master jaw 1, respectively, which are nearer to a center of rotation thereof. As usually known, these wedge grooves 1a are connected to the main shaft, thereby converting an axial movement thereof into a radial movement of the master jaw 1.

The present invention is directed to a claw unit with paired separably connected claw elements, master jaw and top jaw paired therewith, which permit the top jaw to be mounted on or demounted for replacement from the master jaw by way of a simple operation, which consists in forcing the top jaw 20 into a front surface of the master jaw mounted in the chuck body C by moving the top jaw 20 in the axial direction of the main shaft and slightly radially moving the top jaw relative to the master jaw. The embodiment thereof will next be described.

The master jaw 1 connected with and thus made integral with the top jaw 20 is defined, here in this specification, as a claw unit J. The master jaw 1 is formed with an axial stepped through hole 2 substantially at a central portion thereof as viewed in both the heightwise direction and the widthwise direction. A compression spring 3 is mounted within this stepped through hole 2. Against a forward end (on the side of the top jaw 20) of the compression spring 3, there abuts a head portion of a lock bar 4 constituting a locking member, a forward end of which is urged toward the top jaw 20 by means of the compression spring 3. At the back (on the side of the chuck body) of the compression spring 3, a retaining bolt 5 is screwed in a large diameter portion of the stepped through hole 2, the retaining bolt 5 acting to support the compression spring 3 while adjusting the elastic force of the compression spring 3.

As stated before, this lock bar 4 is normally urged toward the top jaw 20. When mounting the top jaw 20 onto the master jaw 1, however, the lock bar 4 must in advance be retreated from the front surface of the master jaw 1 into the axial stepped through hole 2. This advancing and retreating operation for the lock bar 4 is performed by use of an engaging pin 6 which serves as an engaging member. This engaging member is radially fitted from outside the master jaw 1 into the same and toward the lock bar 4. The engaging pin 6 is in such a positional relation with respect to the lock bar 4 that when the lock bar 4 has been forwardly moved to the maximum extent by being urged by means of the spring 3, a center thereof is located at a position of facing the head portion of the lock bar 4. When the center of the engaging pin 6 is located at such a position, a tip end thereof faces the head portion of the lock bar 4 with a small gap existing in between and this tip end is formed with a substantially semicircular protrusion.

For that reason, the protrusion 6a is brought into engagement with the head portion of the lock bar 4 by rotating the engaging pin 6. When the engaging pin 6 is gradually rotated up to a rotation of 180° (half rotation), the lock bar 4 is retreated, against the urging force of the spring, to the maximum extent, and thus disappears from the front surface of the master jaw 1.

A reference numeral 6b denotes a groove into which, for example, a driver is fitted for rotating the engaging pin 6. A reference numeral 7 denotes a knock pin for preventing the disengagement or escapement of the engaging pin 6 by its being screwed into the master jaw 1 from a side thereof and fitted into a circumferential notch formed in the engaging pin 6.

The forward end of the master jaw 1 is allowed slightly to protrude from the chuck body in the axial direction thereof. Further, at a foremost end portion of the axial stepped through hole 2, a seal member 8 is fitted s as to prevent the entry of any chip or dust.

The master jaw 1 is formed, at its front surface, with dovetails 9, 10 in a direction crossing the axial line of the main shaft in such a manner that the dovetails 9, 10 are located at upper and lower positions (FIG. 1) which are symmetrical with respect to a substantial center as viewed vertically of the master jaw 1. The dovetails 9, 10 are engageable with dovetail grooves 22, 23, as later described, formed in a confronting or opposing surface of the top jaw 20, the dovetails 9, 10 serving to support the top jaw 20.

At upper and lower positions (FIG. 1) of the front surface of the master jaw 1, there are embedded a pair of keys 11, 12 which are attached by means of bolts 13, 13. These upper and lower keys 11, 12 are brought into engagement with engaging grooves 24, 25 formed in the confronting surface of the top jaw 20, respectively, so as to limit the rightward or leftward movement of the top jaw 20.

The top jaw 20 has substantially the same height and width as those of the master jaw 1 and is connected for integration with the master jaw 1 to constitute the above-mentioned claw J.

The top jaw 20 also is formed with a positioning hole 21 in the axial direction of the main shaft substantially at its central portion as viewed in both the heightwise direction and the widthwise direction, into which a forward end portion of the lock bar 4 is inserted. When the lock bar 4 which is urged by the elastic force of the spring 3 has been protruded into the top jaw 20, it acts to cause the latter to be positioned.

The top jaw 20 is formed, at its confronting surface, with a pair of upper and lower dovetail grooves 22, 23 in the direction crossing the axial line of the main shaft in such a manner that the dovetail grooves 22, 23 are located at upper and lower positions which are symmetrical with respect to a substantial center as viewed in the vertical direction of the top jaw 20. The dovetail grooves 22, 23 are so formed as to have a width which is larger than that of the dovetails 9, 10, and may have a different shape according to the manner in which the top jaw 20 is used. That is to say, in cases where the top jaw 20 is used as an outer claw as in this embodiment, the reaction force which is applied from a work acts in the radial and outward direction. For this reason, the reaction force ma be received by inclined surfaces 9a, 10a of the dovetails 9, 10. The inclined surfaces 9a, 10a, therefore, of the master jaw 1. Accordingly, the surfaces of the dovetail grooves 22, 23 of the top jaw 20 which are engageable with the inclined surfaces 9a, 10a of the dovetails 9, 10 may relation to such inclined surfaces 9a, 10a.

The confronting surface of the top jaw 20 is formed with engaging key grooves 24, 25 engageable with the above-mentioned keys 11, 12 of the master jaw 1 in such a manner that the key grooves 24, 25 reach the upper and lower dovetail grooves 22, 23 from above and from below, respectively.

In cases where the top jaw 20 is used as an inner claw, the reaction force which is applied from a work acts radially inwardly of the top jaw 20. The reaction force, therefore, may be received by the inclined surfaces 9b, 10b of the dovetails 9, 10. The surfaces of the dovetail grooves 22, 23 of the top jaw 20 which are engageable with the inclined surfaces 9b, 10b of the dovetails 9, 10 may therefore be made inclined surfaces as at 22b, 23b in corresponding relation to such inclined surfaces 9b, 10b.

The operation of connecting the claw elements of the claw unit having the described construction will now be described.

First of all, the engaging pin 6 is rotated by means of, for example, a driver through a manual rotation of the same so as to cause the substantially semicircular protrusion 6a of the engaging pin 6 to engage the lock bar 4 within the master jaw 1. Then, the engaging pin 6 is rotated 180° against the urging force of the compression spring 3 while causing the lock bar 4 to be retreated into the master jaw 1. The lock bar 4 thus is located at a position wherein it is completely caused to disappear from the front surface of the master jaw 1.

Thereafter, the top jaw 20 is pressed against the front surface of the master jaw 1 mounted on the front of the chuck body C. The dovetails 9, 10 on the front surface of the master jaw 1 are thereby loosely inserted into the dovetail grooves 22, 23 of the top jaw 20, respectively, and thus are caused to abut against the same. At the same time, the keys 11, 12 are brought into engagement with the engaging grooves 24, 25, respectively. Thereafter, the top jaw 20 is moved radially outwardly to cause the inclined surfaces 22a, 23a of the top jaw 20 to be pressed against the inclined surfaces 9a, 10a of the dovetails 9, 10 for their abutment against the latter. When, in this state, the engaging pin 6 is rotated in the same manner as mentioned above, the engaging pin 6 comes gradually to disengage from the lock bar 4. Thus, the lock bar 4 is allowed to advance due to the urging force of the compression spring 3, rushing into the positioning hole 21 of the top jaw 20 kept in abutment on the front surface of the master jaw 1. As a result, the top jaw 20 is locked to the master jaw 1 and thus is made integral with the same.

In this way, three master jaws 1 are mounted thereon with three top jaws 20, in turn.

When it is desired to demount the top jaw 20 for replacement thereof, it is sufficient to reverse the sequential order of conducting the above-mentioned mounting or connecting operation. That is to say, the engaging pin 6 is first rotated to cause the lock bar 4 to be located at its retreated position, and then the top jaw 20 is radially inwardly moved to cause the dovetail grooves 22, 23 to disengage from the dovetails 9, 10. Thereafter, the top jaw 20 is drawn off from the master jaw 1.

In this way, according to the above-mentioned embodiment, it is possible to mount the top jaw onto the master jaw by way of a simple operation which consists in pressing the top jaw against the master jaw from the front side thereof in a state wherein the lock bar is retreated from the front surface of the master jaw, and moving the top jaw outwardly or inwardly in the radial direction to a very small extent. For this reason, it is possible to shorten the period of time required for mounting the top jaw or demounting it for replacement. In addition, the top jaw is positioned and fixed by means of the lock bar and, at the same time, the protrusions of the master jaw and the engaging grooves of the top jaw are engaged with each other in both the radial direction and the widthwise direction. This makes it possible to reliably mount the top jaw without misalignment thereof with respect to the master jaw. Further, the advancing and retreating operation for the lock bar can also be performed from the radial direction in a simple manner by way of the engaging pin. Furthermore, the lock bar is not required to have so large a diameter and is sealed at its forward end portion, so that it is possible to prevent the entry thereinto of any chip. Furthermore, it is possible to mount the lock bar in a similar simple manner in any case where the top jaw is used as an inner or outer claw element.

As has been described above, according to the present invention, the top jaw can be mounted onto the master jaw by way of a simple operation which consists in pressing the top jaw against the master jaw from a front side thereof and moving the lock bar. As a result, the operation of replacing the claw element does not require the use of a large amount of time. Further, the reaction force which is applied to the claw unit from a work is received by a plurality of engaging portions provided on the front surface of the master jaw. At the same time, the top jaw is positioned and locked, by means of the locking member, relative, and with respect, to the master jaw. In addition, the position-limiting members are used to limit the rightward and leftward movement of the top jaw. Therefore, the locked state of the top jaw is stabilized after the same is mounted, and, at the same time, the top jaw can be reliably mounted without misalignment thereof when the same is mounted. In addition, the locking member is sealed against the entry of any chip into the master jaw by way of around the locking member. Consequently, it is possible to provide a simple but highly valuable claw unit with paired separably connected claw elements, which enables a reliable aligning to be effected between the two claw elements, and which can be machined with high accuracy.

What is claimed is:

1. A chuck comprising:
a chuck body having a central axis and mounted on a rotatable main shaft of a machine tool;
a master jaw mounted to said chuck body so as to be movable radially relative to said central axis of said chuck body, said master jaw having a front face and a rear face, a dove-tail shaped receiving portion defined in said front face, said receiving portion including first and second planar inclined surface extending in a direction substantially transverse to said radial direction of movement of said master jaw;
a top jaw detachably mounted to said master jaw, said top jaw having a rear face and a front face, said rear face including at least one engaging portion having an inclined surface for engaging one of said inclined surfaces of said receiving portion so that said engaging portion of said top jaw can be engaged with said receiving portion of said master jaw by inserting said engaging portion of said top jaw into said receiving portion of said master jaw and, subsequently, moving said top jaw in said radial direction;
recess means defined on one of said master jaw and said top jaw for cooperating with protrusion means defined on the other of said master jaw and said top jaw to limit movement of said top jaw relative to said master jaw in a direction transverse to said radial direction while allowing relative movement in said radial direction when said top jaw is engaged with said master jaw;

means for locking said top jaw to said master jaw when said top jaw is disposed in a predetermined position relative to said master jaw, said means for locking including a locking element slidably mounted to said master jaw so as to be movable in a direction parallel to said axial direction of said main shaft, means for resiliently urging said locking element towards said top jaw, and a bore defined is said top jaw for receiving said locking member to thereby prevent relative movement of said top jaw and said master jaw in said radial direction and in a direction transverse to said radial direction;

an engaging member having first and second longitudinal ends and a longitudinal axis which extends in a direction substantially perpendicular to said direction of movement of said locking element, a cam engagement element defined at said first end of said engaging member, said cam engagement element being in engagement with said locking element, said second end of said engaging member being exposed to the exterior of said master jaw, said second end of said engaging member having a groove which is engageable so as to rotate said engaging member about said longitudinal axis thereof from the exterior of said master jaw; and means for selectively varying an urging force of said urging means to thereby vary a force urging said locking member in a direction toward said top jaw, said means for selectively varying an urging force being movable in a direction substantially parallel to said axial direction of said main shaft.

* * * * *